(12) United States Patent
Viswanath et al.

(10) Patent No.: US 8,265,098 B2
(45) Date of Patent: Sep. 11, 2012

(54) FLASH POSITION SIGNALING: MULTIPLEXING AND INTERFERENCE MANAGEMENT

(75) Inventors: Pramod Viswanath, Champaign, IL (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 12/479,480

(22) Filed: Jun. 5, 2009

(65) Prior Publication Data

US 2010/0008243 A1   Jan. 14, 2010

Related U.S. Application Data

(60) Provisional application No. 61/080,077, filed on Jul. 11, 2008.

(51) Int. Cl.
*H04J 1/02* (2006.01)
*H04B 1/10* (2006.01)

(52) U.S. Cl. ........................ 370/493; 455/296

(58) Field of Classification Search ............ 370/203, 370/229, 230, 310, 329, 330, 335, 336, 493–495; 455/296, 63.1, 63.3, 278.1, 501
See application file for complete search history.

(56) References Cited

U.S. PATENT DOCUMENTS

| 7,480,516 B1 * | 1/2009 | Chen et al. | 370/335 |
|---|---|---|---|
| 7,554,945 B2 * | 6/2009 | Lee et al. | 370/329 |
| 7,801,482 B2 * | 9/2010 | Chen et al. | 370/318 |
| 2003/0214917 A1 * | 11/2003 | Molisch et al. | 370/286 |
| 2008/0089278 A1 | 4/2008 | Chang et al. | |
| 2010/0278034 A9 * | 11/2010 | Laroia et al. | 370/209 |

FOREIGN PATENT DOCUMENTS

EP   1775901 A1   4/2007

OTHER PUBLICATIONS

International Search Report & Written Opinion—PCT/US2009/049314, International Search Authority—European Patent Office—Dec. 8, 2010.
Texas Instruments: "Control Channel Coding for Uplink Scheduling in E-UTRA Downlink" 3GPP Draft; RI-063221 Ulgrant, Srd Generation Partnership Project (3GPP), Mobile Competence Centre ; 650, Route Des Lucioles ; F-06921 Sophia-Antipolis Cedex ; France, vol. RAN WG1, No. Riga, Latvia; 20061102, Nov. 2, 2006, XP050103676 [retrieved on Nov. 2, 2006] p. 1, Srd paragraph.
ETKIN et al. Gaussian Interference Channel Capacity to Within One Bit: the General Case, IEEE International Symposium on Information Theory, 2007, ITIS 2007, pp. 2181-2185.
SHAMAI et al. "Worst-Case Power-Constrained Noise for Binary-Input Channels," IEEE Transactions on Information Theory, vol. 38, No. 5, pp. 1494-1511, Sep. 1992.

* cited by examiner

*Primary Examiner* — Kerri Rose
(74) *Attorney, Agent, or Firm* — Florin C. Corie

(57) ABSTRACT

Systems and methodologies are described that facilitate use of power and phase coherence to multiplex or manage interference in a wireless communication environment. In accordance with various aspects set forth herein, systems and/or methods are provided that receive a spectrum of tones that include additional data, ascertain whether or not tone intensities of received tones included in the spectrum of tones exceeds a threshold, based on whether or not the tone intensities of the received tones exceed the threshold, decode information included in the received tones to extract the additional data, and thereafter decode information included in one or more remaining tones that fail to exceed the threshold in order to extract primary data.

35 Claims, 12 Drawing Sheets

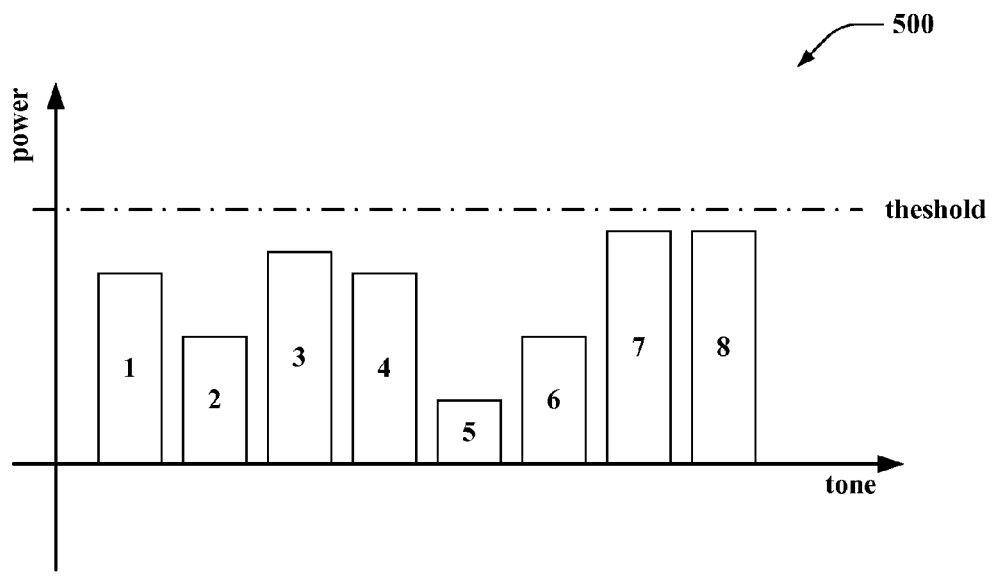
FIG. 5
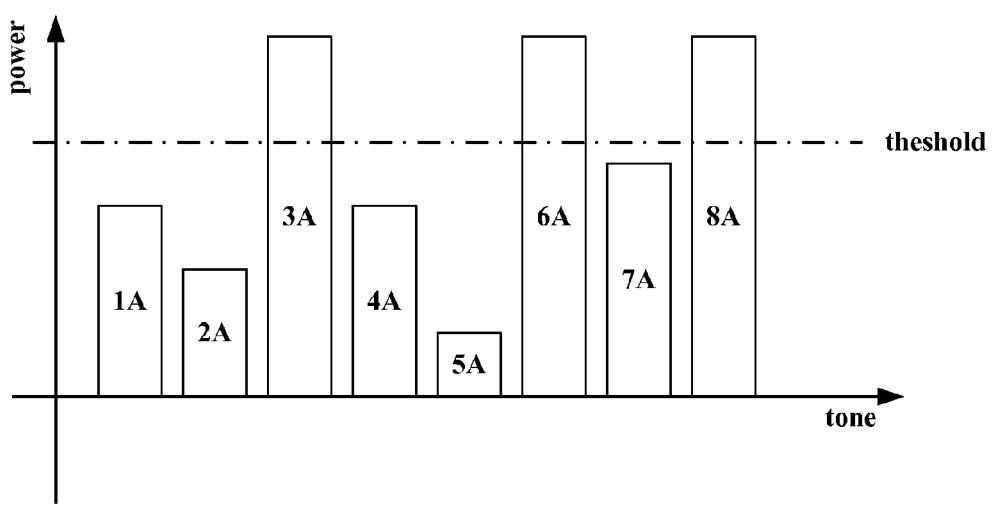

FLASH POSITION SIGNALING: MULTIPLEXING AND INTERFERENCE MANAGEMENT

CLAIM OF PRIORITY UNDER 35 U.S.C. §119

The present Application for Patent claims priority to Provisional Application No. 61/080,077, entitled "FLASH POSITION SIGNALING: MULTIPLEXING AND INTERFACE MANAGEMENT", filed Jul. 11, 2008, which is assigned to the assignee hereof and hereby expressly incorporated by reference herein.

BACKGROUND

I. Field

The following description relates generally to wireless communications, and more particularly to methods and systems to enable the multiplexing of flash signals within base stations and managing interference from flash signals within base stations.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

In recent years, users have started to replace fixed line communications with mobile communications and have increasingly demanded great voice quality, reliable service, and low prices.

In addition to mobile phone networks currently in place, a new class of small base station has emerged, which may be installed in a user's home or office and provide indoor wireless coverage to mobile units using existing broadband Internet connections. Such personal miniature base stations are generally known as access point base stations, or, alternatively, Home Node B (HNB) or femtocells. Typically, such miniature base stations are connected to the Internet and the mobile operator's network via DSL router or cable modem.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The claimed subject matter relates to base stations or access terminals transmitting "peaky" signals wherein the base station or access terminal puts its energy in only a small fraction of tones available for it to transmit over, such that the energy is quite high when it is not zero. This small fraction of tones to which the energy is high should be easily detectable (e.g., through a noncoherent threshold detector) both at the base station of interest as well as at neighboring base stations which can perceive these high energy tones as interference. Most of the information transmitted is generally contained in the position of which tones are "lit-up" or intensified. Additionally, if good channel coherence across the band is to be expected then information can also be included in the phase of the tones that are "lit-up".

In accordance with an aspect set forth herein, the claimed subject matter provides a method that effectuates use of power and phase coherence to multiplex or manage interference in a wireless communication environment wherein the method receives a spectrum of tones that include additional data, ascertains whether or not a tone intensity of the received tone included in the spectrum of tones exceeds a threshold, based at least in part on whether or not the tone intensity of the received tone exceeds the threshold, decodes information included in the received tone to extract the additional data; and thereafter decodes information included in one or more remaining tones that fail to exceed the threshold to extract primary data.

The subject matter as claimed in accordance with a further aspect provides a wireless communications apparatus that comprises a memory that retains instructions related to acquiring a spectrum of tones that include additional data, determining whether a tone intensity of a received tone included in the spectrum of tones exceeds a threshold, based at least in part on the determining, extracting the additional information included in the received tone, and extracting primary data included on one or more remaining tones that fail to exceed the threshold, and a processor, coupled to the memory, configured to execute the instructions retained in the memory.

In accordance with yet a further aspect, the claimed subject matter provides a wireless communications apparatus that effectuates use of power and phase coherence to multiplex or manage interference in a wireless communication environment. The apparatus can include means for receiving a spectrum of tones that include additional data, means for ascertaining whether or not a tone intensity of a received tone included in the spectrum of tones exceeds a threshold, means for decoding information included in the received tone to extract the additional data based at least in part on whether the tone intensity of the received tone exceeds the threshold, and means for extracting primary data on one or more remaining tones that fail to exceed the threshold.

Further, in accordance with another aspect, the claimed subject matter discloses a computer program product, comprising a computer-readable medium wherein the computer readable medium comprises code for obtaining a spectrum of tones that include additional data, code for ascertaining whether or not a tone intensity of a received tone associated with the additional data exceeds a threshold, code for extracting the additional data from the received tone with the tone intensity that exceeds the threshold, and code for extracting primary data for the received tone that fails to exceed the threshold.

Additionally, in accordance with yet another aspect, the claimed subject matter provides a wireless communications apparatus, comprising a processor configured to receive a spectrum of tones that include additional data, determine whether a tone intensity of a received tone included in the spectrum of tones markedly surpasses a threshold, extract additional data included in the received tone based at least in part on whether the tone intensity of the received tone exceeds the threshold, and thereafter extract primary data included in the received tone that fails to exceed the threshold.

Moreover, the claimed subject matter, in accordance with a further aspect, provides an additional method that effectuates use of power and phase coherence to multiplex or manage interference in a wireless communication environment, wherein the method comprises randomly selecting one or more tones on which to convey additional data, encoding primary data across a spectrum of tones, encoding the additional data on the one or more randomly selected tones and artificially boosting the one or more randomly selected tones to exceed a threshold, and subsequently transmitting the spectrum of tones that includes the one or more randomly selected and artificially boosted tones.

Furthermore, in accordance with a further aspect, the claimed subject matter provides a wireless communications apparatus, that includes a memory that retains instructions related to randomly selecting one or more tones on which to convey additional data, encoding primary data across a spectrum of tones, encoding the additional data on the one or more randomly selected tones and artificially boosting the one or more randomly selected tones to exceed a threshold, and thereafter transmitting the spectrum of tones that includes the one or more randomly selected and artificially boosted tones. Additionally, the wireless communication apparatus can include a processor, coupled to the memory, configured to execute the instructions retained in the memory.

In addition and in accordance with yet a further aspect, the claimed subject matter discloses a wireless communications apparatus that effectuates use of power and phase coherence to multiplex and/or manage interference in a wireless communication environment. The wireless communication apparatus can include means for randomly selecting one or more tones on which to convey additional data, means for distributing primary data across a spectrum of tones, means for distributing the additional data on the one or more randomly selected tones and artificially boosting the one or more randomly selected tones to exceed a threshold, and means for transmitting the spectrum of tones that includes the one or more randomly selected and artificially boosted tones.

Furthermore, in accordance with a further aspect, the claimed subject matter discloses a computer program product, comprising a computer-readable medium, wherein the computer-readable medium includes code for randomly selecting one or more tones on which to convey additional data, code for encoding primary data across a spectrum of tones, code for encoding the additional data on the one or more randomly selected tones and artificially boosting the one or more randomly selected tones to exceed a threshold, and code for transmitting the spectrum of tones that includes the one or more randomly selected and artificially boosted tones.

Additionally, the claimed subject matter, in accordance with a further aspect, discloses a wireless communications apparatus that includes a processor configured to randomly select one or more tones on which to convey additional data, disperse primary data across a spectrum of tones, include the additional data on the one or more randomly selected tones and artificially boost the one or more randomly selected tones to exceed a threshold, and subsequently broadcast the spectrum of tones that includes the one or more randomly selected and artificially boosted tones.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

BRIEF DESCRIPTION OF THE DRAWINGS

FIG. 5 depicts illustrative tonal spectrums that can be employed in accordance with various aspects of the claimed subject matter.

DETAILED DESCRIPTION

Figure 1:
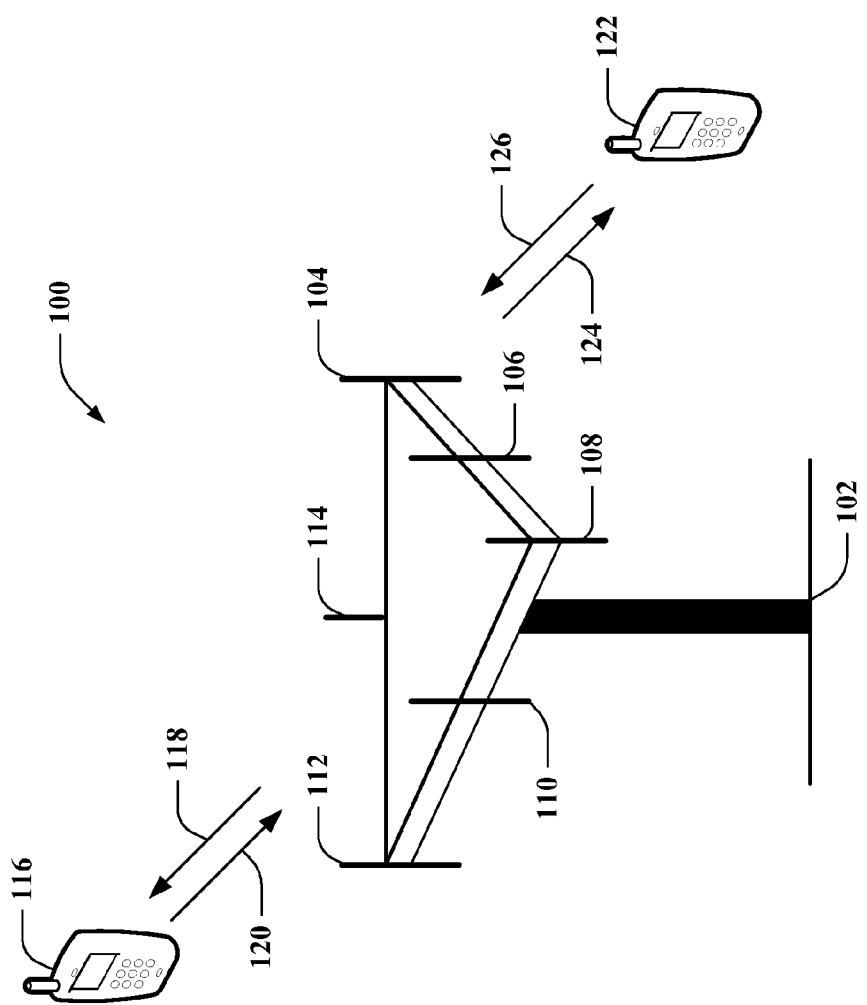
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
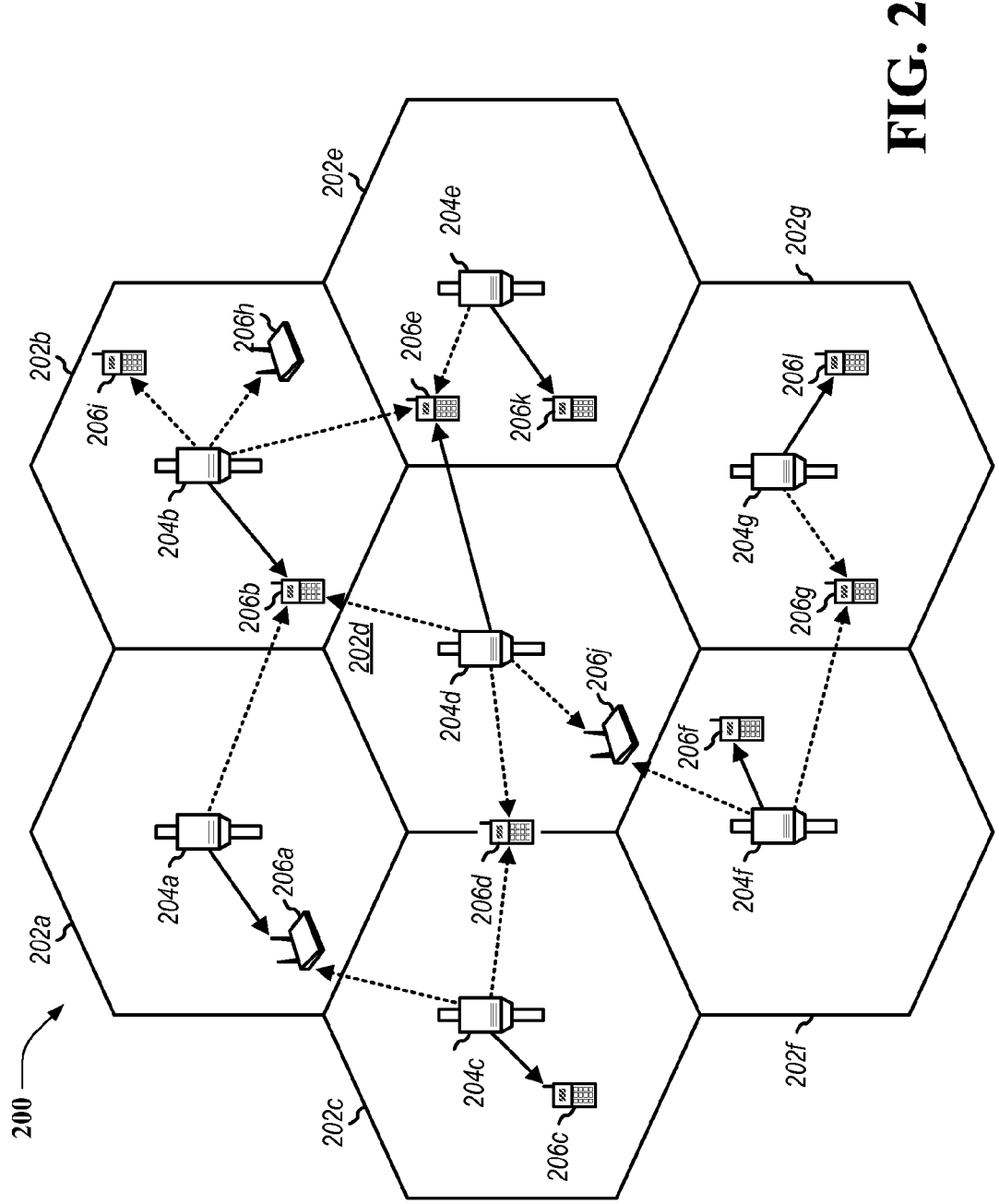
FIG. 2 provides illustration of a further wireless communication system configured to support a number of users, in which various disclosed embodiments and aspects can be implemented.

FIG. 2 provides illustration of a further wireless communication system 200 configured to support a number of users, in which various disclosed embodiments and aspects may be implemented. As shown in FIG. 2, by way of example, system 200 provides communication for multiple cells 202, such as, for example, macro cells 202a-202g, with each cell being serviced by a corresponding access point (AP) 204 (such as APs 204a-204g). Each cell may be further divided into one or more sectors. Various access terminals (ATs) 206, including ATs 206a-206k, also known interchangeably as user equipment (UE) or mobile stations, are dispersed throughout the system. Each AT 206 may communicate with one or more APs 204 on a forward link (FL) and/or a reverse link (RL) at a given moment, depending upon whether the AT is active and whether it is in soft handoff, for example. The wireless communication system 200 may provide service over a large geographic region, for example, macro cells 202a-202g may cover a few blocks in a neighborhood.

At the outset and prior to providing an extensive exposition of the claimed subject matter, it should be noted without limitation or loss of generality, that while the claimed subject matter might in certain instances and/or aspects be explicated in terms of access point base stations, femtocells, or Home Node B (HNB) stations, the claimed subject matter can nonetheless can find expansive application and/or utility within a wider wireless communication infrastructure. For instance, the claimed subject matter can be utilized within true base stations and/or access terminals with equal and indistinguishable effect and/or applicability.

In traditional cellular systems, interference can be managed centrally. This can be done via various mechanisms (e.g., spreading information over the whole band on the uplink, synchronized scheduling across sectors in the down link, etc.). Further, there can be slower time scale feedback mechanisms built in to the design to ensure that interference does not become too overwhelming (e.g., other sector interference (OSIB) in high data rate (HDR) and ultra mobile broadband (UMB) technologies). With the aim of improving uplink performance, access point base stations have been proposed. The proposal being that users install relay routers in their home/office environments: these relay routers being connected to the Internet via wire line link or to a true base station via a wireless link.

The concept that underlies the claimed subject matter relates to base stations or access terminals transmitting "peaky" signals wherein the base station or access terminal puts its energy in only a small fraction of tones available for it to transmit over, such that the energy is quite high when it is not zero. This small fraction of tones to which the energy is high should be easily detectable (e.g., through a noncoherent threshold detector) both at the base station of interest as well as at neighboring base stations which can perceive these high energy tones as interference. Most of the information transmitted is generally contained in the position of which tones are "lit-up" or intensified. Additionally, if good channel coherence across the band is to be expected then information can also be included in the phase of the tones that are "lit-up".

Figure 3:
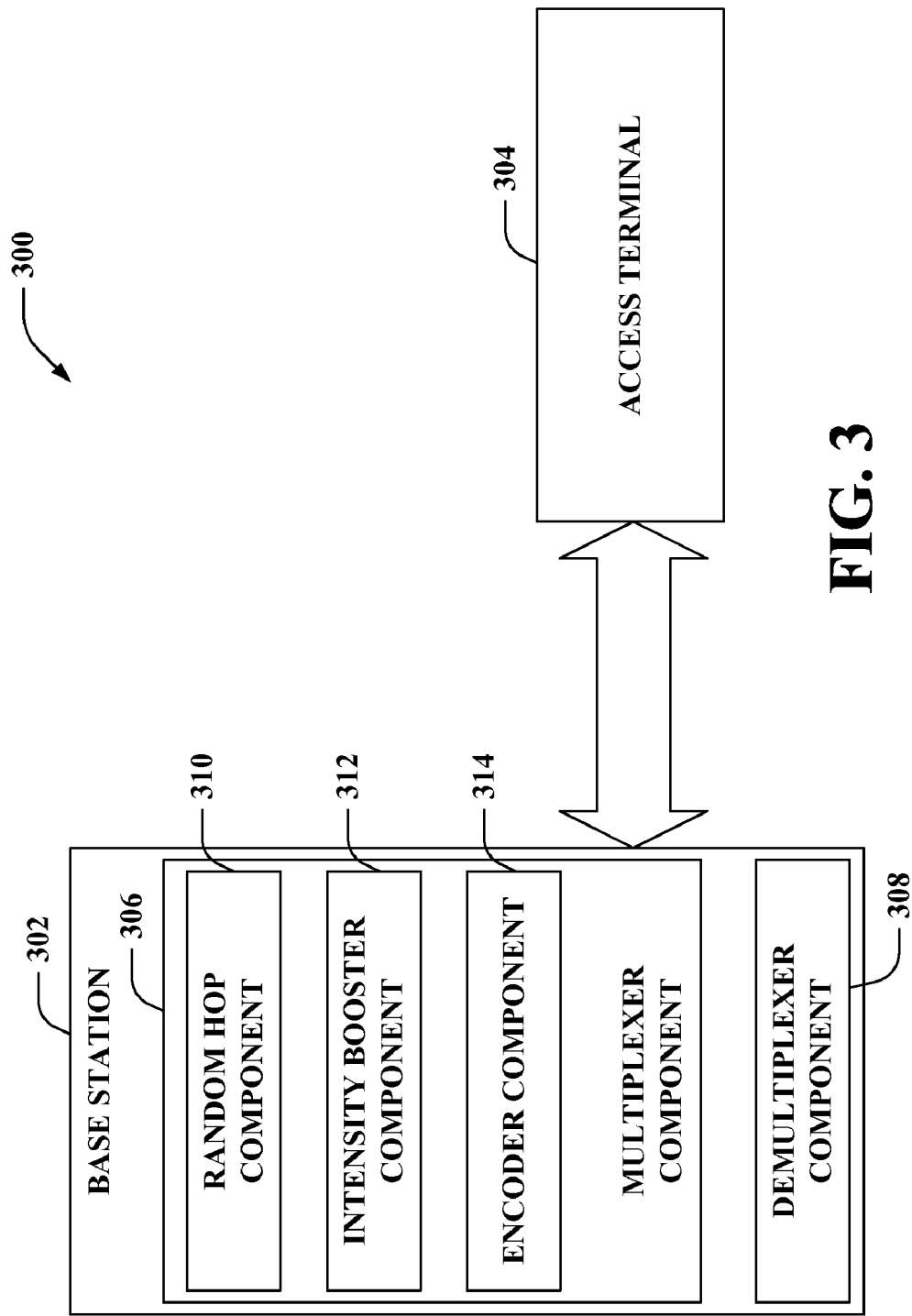
FIG. 3 is an illustration of an example system that effectuates and/or facilitates use of power and phase coherence to multiplex and/or manage interference in the context of flash signals in accordance with various aspects of the claimed subject matter.

Turning now to FIG. 3 that illustrates a system 300 that effectuates and/or facilitates use of power and phase coherence to multiplex and/or manage interference in the context of flash signals. As depicted, system 300 can include base station 302 that can be in continuous and/or operative or sporadic and/or intermittent communication with access terminal 304. Since the basic functionality of base station 302 and access terminal 304, respectively, have been explicated above in connection with FIG. 1 and FIG. 2, a detailed description of such features has been omitted to avoid needless repetition and for the sake of brevity and conciseness. Nevertheless as illustrated, base station 302 can include multiplexer component 306 that can randomly select tones (or tonal positions) on which additional packet data, that is typically quite small (e.g., 400 uncoded bits or so) and generally has fairly short latency requirements, can be included. Examples of such additional packet data can include, without limitation or loss of generality, Voice over Internet Protocol (VoIP) packets, Transmission Control Protocol (TCP) acknowledgement (ACK) and negative acknowledgement (NACK) packets, and gaming packets. Further, multiplexer component 306 can also encode primary packet data (e.g., communication data that is generally large and can have large latency requirements) which can be spread across the entire tonal spectrum, as well as encode the additional packet data for inclusion in the tonal spectrum based at least in part on the randomly selected tones (or tonal positions). Additionally, multiplexer component 306 can boost the signal strength or intensity of those randomly selected tones that contain additional packet information. The signal strength or intensity of the randomly selected tones can be set to an intensity that disproportionately exceeds a threshold level, wherein the threshold level indicates a normal operational intensity level extant or associated with the wireless communication network in its entirety.

It should be noted without limitation that when multiplexer component 306 boosts or amplifies the signal strength or intensity of tones containing or including additional packet information (e.g., tones that have been randomly selected), the underlying primary packet data that would ordinarily have been included at the randomly selected tonal position (or tone) will be obliterated as the boosted or amplified tone attributable to the additional packet data is superimposed or super postioned over the tone carrying the primary packet data at that particular tone. Once the tonal spectrum has been appropriately constructed to include primary packet and/or additional packet information, the spectrum can be broadcast for receipt, in this instance, by access terminal 304.

Accordingly, to effectuate the foregoing, multiplexer component 306 can include random hop component 310 that can randomly select tones on which to transport and/or intercalate additional packet information. The number of tones randomly selected to convey or carry the extra packet payload information can be dependent on the number of tones utilized within the communication network for this purpose. For instance, if the communication network has been set up to utilize a tonal spectrum comprising $2^n$ tones, then n tones, randomly selected, can be employed in order to distribute and/or broadcast the additional packet information. For example, if the communication network has been configured to utilize a tonal spectrum comprising $2^3$ tones (e.g., 8 tones), then 3 tones, randomly selected, can be employed to carry additional packet information. Similarly, if the network utilizes a tonal spectrum comprising $2^{64}$ tones, then 64 tones can be utilized to carry additional packet information. Thus, in order to provide a random selection of tone locations within the tonal spectrum utilized within the communication network, random hop component 310 can be employed. Random hop component 310 can utilize one or more pseudo-random number techniques to automatically create a sequence of independent random numbers with a specified distribution (e.g., each number is obtained by chance having nothing to do with other numbers of the sequence, wherein each number has a specified probability of falling in any given range of values). Examples of pseudo-random number generation techniques that, without limitation, can be employed by random hop component 310 include the linear congruential method (and its variants), the middle-square method, Box-Muller transform, use of a linear feedback shift register, etc.

It should be noted, without limitation or loss of generality, that the random selection of tones on which to convey additional packet information is but one mechanism by which the claimed subject matter can be implemented. Nevertheless, as will be appreciated by those moderately conversant in this field of endeavor, the claimed matter can be implemented with equal applicability and utility by selecting consecutive n tones, alternate n tones, the first n tones, the last n tones, the median n tones, etc.

Additionally, multiplexer component 306 can include intensity booster component 312 that utilizes the random selection of tones provided, or identified, by random hop component 310 to amplify or intensify the signal strength of those randomly selected tones in order to convey additional information over and above information that will be transmitted in the primary packet payload. As indicated above, the additional information typically relates to information that is small and generally has relatively short latency requirements, such as Voice over Internet Protocol (VoIP) packets, Transmission Control Protocol (TCP) acknowledgement (ACK) and negative acknowledgement (NACK) packets, and gaming packets, for example. The intensity at which intensity booster component 312 amplifies the signal strength of the randomly selected tones can be set to disproportionately exceed a threshold that indicates the typical or normal operational intensity level extant in the wireless communication network in its entirety, or the normal operation intensity level in existence in the portion of the wireless communication network at issue. Moreover, it should also be noted without limitation or loss of generality, that where a randomly selected tone is amplified beyond the threshold, the boosted tone that includes the additional information is superimposed over the underlying data that would ordinarily have been included at the randomly selected tonal position, thereby causing the expunction of any information being carried by the underlying tone.

Moreover, multiplexer component 306 can also include encoder component 314 that encodes initial packet data across the entire tonal spectrum and thereafter encodes the additional packet data based at least in part on the location of the randomly selected tones within the tonal spectrum. For instance, if the entire tonal spectrum comprises eight tones (e.g. $2^3$ tones), then encoder component 314 can encode the primary packet data, being data that typically is large with significant latency requirements, over all eight tones in a manner that is normal (e.g., without disproportionately boosting or enhancing the intensity of any of the eight tones), and thereafter can utilize the three randomly selected tones (e.g., tones randomly identified by random hop component 310) to selectively encode the additional packet data (e.g., tones that are disproportionately amplified to exceed the normal operation intensity level extant in the wireless communication network as a whole, or beyond the normal intensity threshold in existence in the portion of the wireless communication network at issue). Thus it should be noted with respect to the foregoing illustration, five of the eight tones will be transmitted at a normal tonal intensity and the remaining three randomly identified and/or positioned tones will be transmitted at a disproportionately exaggerated intensity level (e.g., beyond the threshold level established for the wireless communication network in whole or in part).

To provide further illustration of the claimed subject matter, consider a situation where the tonal spectrum comprises thirty-two tones (e.g. $2^5$ tones). In this case five of the thirty-two tones will be randomly identified by random hop component 310 to be carriers of additional data and candidates for amplification beyond the normal tonal intensity in existence in the wireless communication network as a whole, or in part, and the remaining twenty-seven tones will carry the primary packet data but their intensities will not be boosted beyond the normal threshold. Accordingly in this instance, encoder component 314 can initially encode the primary packet data so that it is spread across all thirty-two tones of the tonal spectrum, and thereafter, encoder component 314 can encode the additional data into the five randomly identified tonal locations so that the additional data is randomly interspersed within the thirty-two tones. All that distinguishes the tonal locations of the additional data in the random interspersion is that five of the thirty-two tones have a significantly disproportionate intensity both in comparison to the remaining twenty-seven tones as well as in relation to the intensity threshold normal extant in the wireless communication network. Once again, and as noted earlier, the information encoded in the five randomly identified and markedly amplified tones irretrievably over-writes the primary packet data initially laid down by encoder component 314 with the additional data.

Moreover, base station 302 can also include demultiplexer component 308 that can operate in a manner similar to that described in connection with access terminal 304 below.

Figure 4:
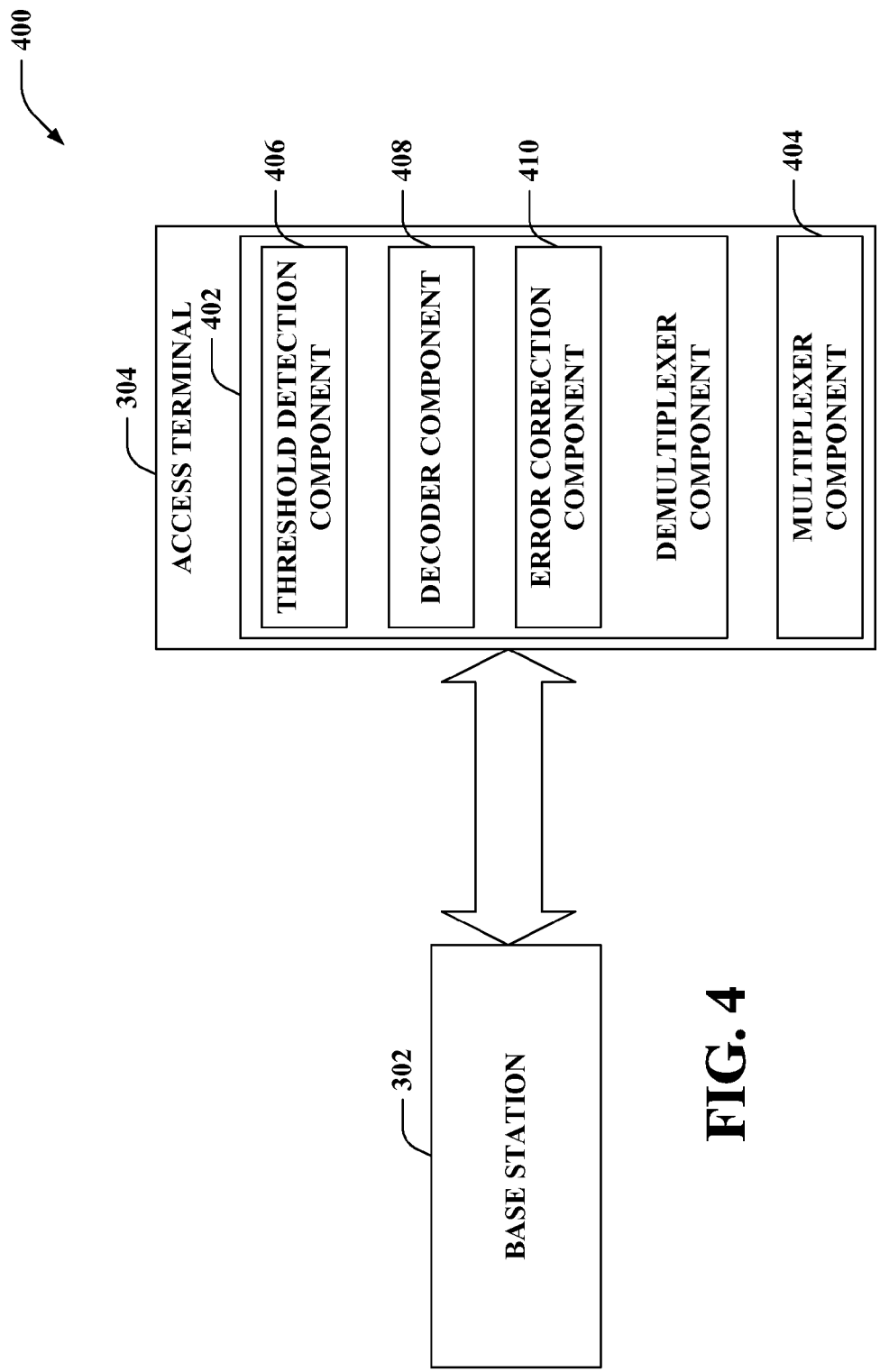
FIG. 4 is an illustration of an example system that effectuates and/or facilitates use of power and phase coherence to multiplex and/or manage interference in the context of flash signals in accordance with various aspects of the subject disclosure.

FIG. 4 depicts a system 400 that effectuates and/or facilitates use of power and phase coherence to multiplex and/or manage interference in the context of flash signals. As depicted, system 400 includes base station 302 and access terminal 304 that can be in continuous and/or sporadic communication with one another. Since discourse on the basic functionality of both base station 302 and access terminal 304 have been set forth above in connection with FIG. 1 and FIG. 2, further description of such aspects has been omitted to avoid needless prolixity and for the sake of conciseness of exposition. Nonetheless as depicted, access terminal 304 can include demultiplexer component 402 that can detect whether or not one or more tones in a received spectrum of tones crosses a threshold, wherein the threshold provides demarcation between typical or normal intensity levels (inclusive of purely environmentally induced factors) in existence within the wireless communication network as a whole, or in part, and deviate intensity levels not attributable to environmentally induced factors and atypical for the wireless communication network in whole, or in part. More specifically, the threshold indicates a boundary that, in general, is rarely crossed and usually is not attained during normal operation but for the engineered intensity augmentation provided by the claimed subject matter, but nevertheless when breached, provides indubitable indication of the presence of adscititious information on randomly located tones within the tonal spectrum. Once demultiplexer component 402 has ascertained whether or not any of the tones in the incoming spectrum of tones exceeds a pre-determined threshold (or a dynamically contemporaneously established threshold) thereby providing indication of the inclusion of substitutive adjunct information, demultiplexer component 402 can decode those tones that exceed the threshold to extract the added information, and thereafter in concert with a phalanx of error correction modalities can decode the remaining tones in the delivered spectrum of tones in order to retrieve information contained therein.

Accordingly and in fulfillment of the foregoing, demultiplexer component 402 can include threshold detection component 406 that can ascertain whether or not tones, if any, in a spectrum of received tones exceed a threshold intensity level. The threshold level utilized by threshold detection component 406 can be pre-established at an earlier time or can be dynamically and/or automatically realized during receipt of the spectrum of tones. Where the threshold level employed by threshold detection component 406 is pre-established at an earlier time, the threshold level can be updated periodically (e.g., every minute, every hour, every three hours, four times a day, etc.) to account for variations in ambient environmental conditions that can affect calibration of the threshold level. Similarly, where the threshold intensity level is ascertained concomitantly or isochronally during receipt of the spectrum of tones, account can be taken of the environmental conditions existing at the time of receipt of the spectrum of tones. Consequently, based at least in part on the threshold intensity level ascertained, threshold detection component 406 can determine whether any of the received tones markedly surpasses the established threshold and whether or not the number of tones that do exceed the threshold, comport with the number of tones set aside within the communication network for this purpose. For instance, if the communication network has been set up to employ a tonal spectrum comprising $2^3$ tones (e.g., 8 tones), threshold detection component 406 will expect three tones to disproportionately and distinctly exceed the established threshold level. Thus, under this scenario, if threshold detection component 406 were to detect the presence of less than three tones or more than three tones that manifestly surpass the established threshold, threshold detection component 406 can attribute such an occurrence to an error in transmission or receipt of the tonal spectrum and can request the conveying component (e.g., base station 302) to retransmit the spectrum and/or can dispatch the spectrum of tones to decoder component 408 and/or error correction component 410 for appropriate rectification. Where on the other hand threshold detection component 406 identifies the appropriate number (e.g., consistent with the tonal spectrum pattern employed by the communication network) of noticeably amplified tones, threshold detection component 406 can make indication of this fact for future use by decoder component 408. Nevertheless and despite the foregoing, it should be noted without limitation or loss of generality, where there are no tones that conspicuously transcend the instituted intensity threshold, threshold detection component 406 can ascribe such an occurrence to the fact that the conveying component (e.g., base station 302) has not appended or intercalated additional information within the tonal spectrum, and as such threshold detection component 406 can forward the spectrum of tones, without more, to decoder component 408 for further processing and/or analysis.

Decoder component 408 can acquire the tonal spectrum from threshold detection component 406 together with indication, where appropriate, as to whether or not the proper number of perceptibly intensified tones is contained therein. Indication as to whether or not the correct number of markedly intensified tones is included within the tonal spectrum can be provided, for example, through a flag mechanism, conveyed from threshold detection component 406 to decoder component 408. Accordingly, based at least in part on the indication as to whether or not the proper number of perceptibly intensified tones is included in the tonal spectrum, decoder component 408 can both reconstitute the primary packet payload as well as recover the additional information intercalated within the tonal spectrum. For example, where threshold detection component 406 indicates that the tonal spectrum contains the proper number of randomly intensified or amplified tones, decoder component 408 can extract the information conveyed on the randomly intermingled but intensified or amplified tones (e.g., the additional information randomly interspersed within the tonal spectrum), and thereafter in conjunction with error correction component 410 can retrieve the primary information associated with the remaining non-intensified or amplified tones. For instance, where the tonal spectrum comprises sixteen tones (e.g., $2^4$ tones), decoder component 408 can initially extract the additional information carried on the four randomly interspersed but amplified tones, and thereafter, keeping in mind that the four randomly intercalated and markedly amplified tones have overwritten aspects of the underlying primary information, in conjunction with facilities and/or functionalities provided by error correction component 410, decoder component 408 can extract the primary data included in the remaining twelve tones.

In a manner similar to that elucidated above, decoder component 408 can obtain the primary information included in the spectrum of tones when none of the tones have been randomly selected and disproportionately boosted beyond the instituted intensity threshold. For example, threshold detection component 406 can indicate to decoder component 408 that the intensity of all the received tones fall below the established intensity threshold and as such this can signify to decoder component 408 that no additional information has been included within the received tonal spectrum, and as such that only primary data need be extracted from the tonal spectrum.

Further with respect to the situation where less than or more than the expected number of randomly intensified tones is received by threshold detection component 406 and is forwarded to decoder component 408, decoder component 408 in concert with error correction component 410 can extract the additional information carried on the randomly dispersed and amplified tones, wherein error correction component 410 can employ one or more error correction schemes or code, and thereafter decoder component 408, once again with error correction component 410 can extract the primary data included in the remaining tones that are not artificially boosted.

As stated above, error correction component 410 can be utilized in conjunction with decoder component 408 to reconstruct the original error-free data included in the received tonal spectrum. Accordingly, in order to facilitate such aims, error correction component 410 can utilize one or more error correction schemes or methods to provide error-free data. For example, error correction component 410 can employ convolution codes, constant-weight codes, erasure codes, binary Golay codes (e.g., extended binary Golay code and/or perfect binary Golay code), Ternary Golay codes, Hadamard codes, Hagelbarger codes, Hamming codes, and the like, to correct for errors or omissions that might be apparent in the tonal spectrum.

Additionally, access terminal 304 can also include multiplexer component 404 that can operate in a manner similar to that elucidated in connection with base station 302, and in particular, in a manner similar to multiplexer component 306 as set forth above.

FIG. 5 depicts illustrative tonal spectrums 500 that can be employed in accordance with various aspects of the claimed subject matter. As illustrated in the top view, the tonal spectrum comprises eight tones (e.g., $2^3$ tones) wherein none of the eight tones have been randomly selected and artificially boosted to exceed a threshold established for the communication network. In this instance, since none of the tones surpass the threshold it is to be assumed that the information relates purely to primary data and that no additional "piggybacked" data has been included therein. In contrast and as illustrated in the bottom view, three of the eight tones (e.g., tones 3A, 6A, and 8A) have been randomly selected or identified to carry additional "piggybacked", and as such, these tones have been engineered or artificially boosted beyond the extant threshold to take into account environmentally induced variation and/or amplification that can occur naturally. As will be appreciated by those of moderate comprehension of the claimed subject matter, the intensity with which the randomly identified and manifestly amplified tones are engineered takes into account of any environmentally induced augmentation that can spontaneously occur during normal operation of a communication network.

Figure 6:
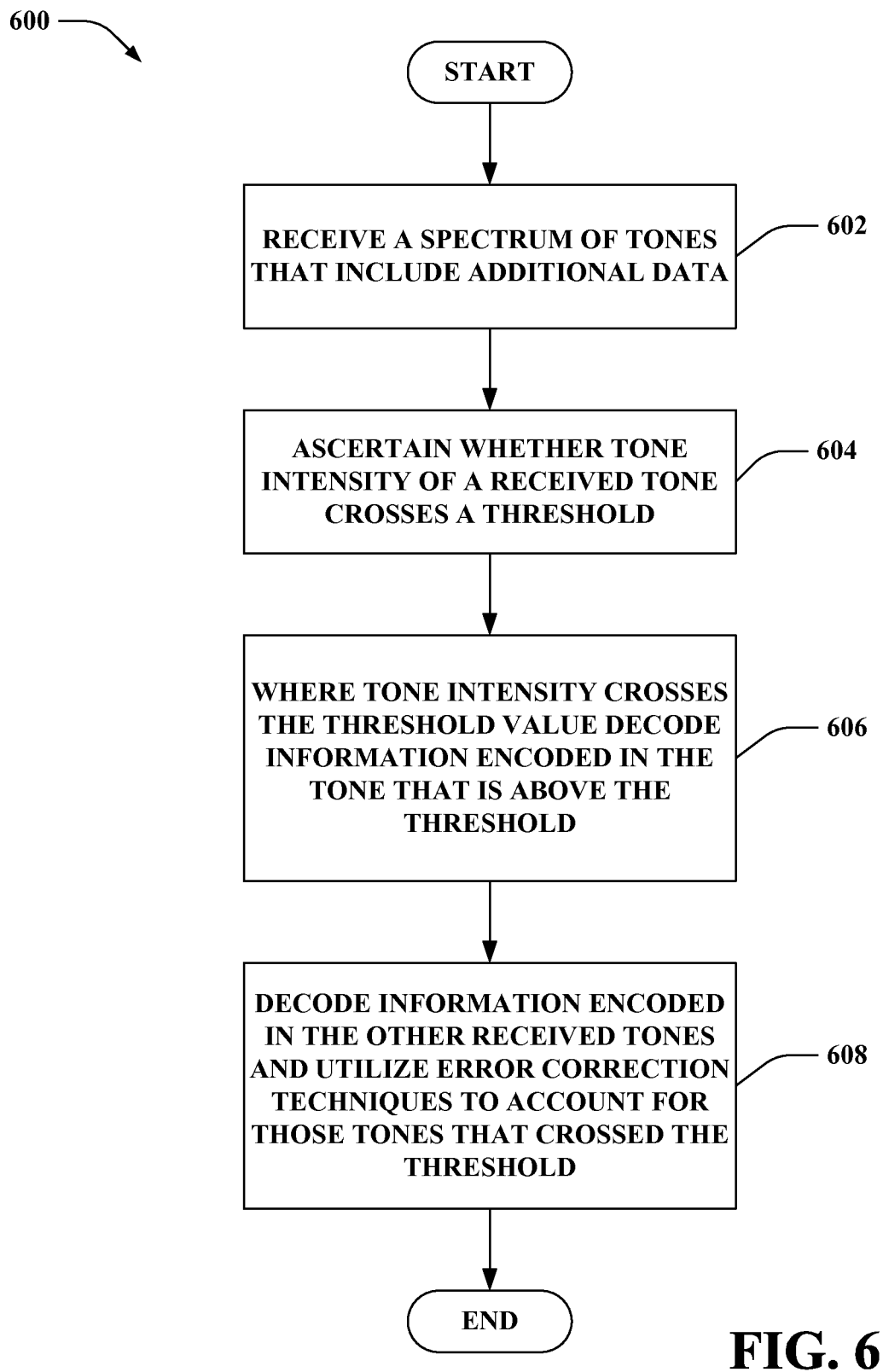
FIG. 6 is an illustration of an example methodology that effectuates and/or facilitates use of power and phase coherence to multiplex and/or manage interference in the context of flash signals in a wireless communication environment.
Figure 7:
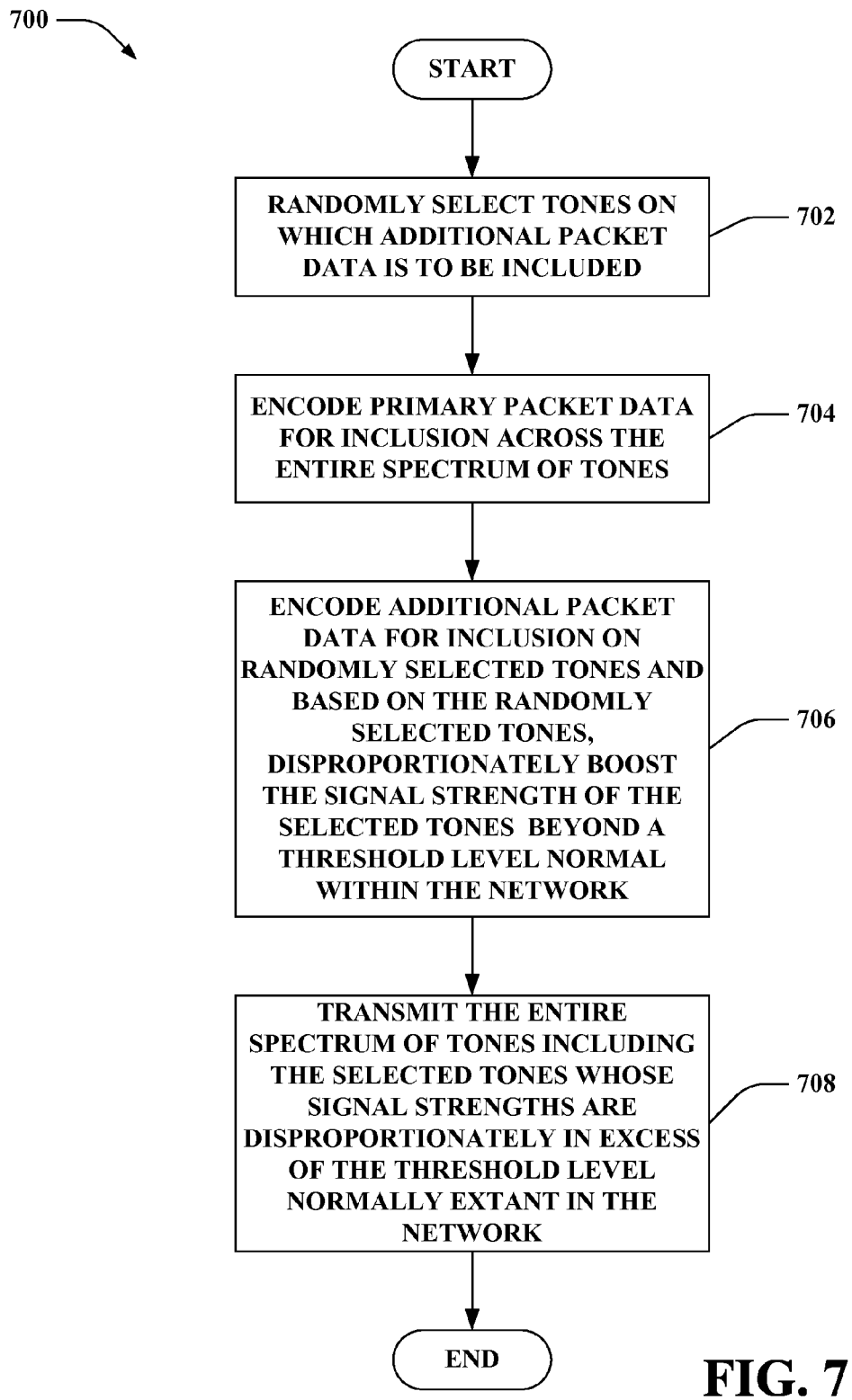
FIG. 7 is an illustration of an example methodology effectuates and/or facilitates use of power and phase coherence to multiplex and/or manage interference in the context of flash signals in a wireless communication environment.

Referring to FIGS. 6-7, methodologies relating to the use of power and phase coherence to multiplex and/or manage interference in the context of flash signals are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 6, illustrated is a methodology 600 that effectuates and/or facilitates use of power and phase coherence to multiplex and/or manage interference in the context of flash signals in accordance with an aspect of the claimed subject matter. Method 600 can commence at 602 where a spectrum of tones that includes additional data included within a fixed number of randomly identified and markedly amplified tones is received. At 604 determination can be made as to whether or not any of the tones in the received spectrum surpasses or crosses a threshold, wherein the threshold indicates a boundary that, in general, is rarely crossed and usually is not attained during normal operation but for the engineered intensity augmentation provided by the claimed subject matter, but nevertheless when breached, provides definitive indication of the presence of additional information on randomly located tones within the tonal spectrum. At 606 with respect to those tones that are identified as having been amplified to surpass the threshold, these tones can be decoded to extract any information that has been encoded therein. At 608 information encoded in the remaining tones (e.g., those tones that are perceived as not having been boosted beyond the threshold) can be decoded with the aid of one or more error correction codes.

FIG. 7 illustrates a methodology 700 that facilitates or effectuates use of power and phase coherence to multiplex and/or manage interference in the context of flash signals in accordance with an aspect of the claimed subject matter. Methodology 700 can commence at 702 where a random selection of tones can be selected on which additional information is to be included. At 704 primary packet data can be encoded for inclusion in the tonal spectrum. It should be noted that at 704 encoded primary packet data is dispersed across the entire spectrum of tones. Thus for example, if the tonal spectrum comprises one-hundred and twenty-eight tones (e.g., $2^7$ tones), the primary packet data can be encoded and spread across all one-hundred and twenty-eight tones. At 706 additional packet data can be encoded for inclusion on the randomly selected tones identified at 702 and thereafter these tones carrying the additional packet data can be amplified so that their respective signal strengths each surpass a threshold level that is normal or typical within the communication network. At 708 the entire spectrum of tones inclusive of the randomly selected and artificially amplified tone conveying additional information can be transmitted for reception by a receiving component (e.g., base station 302 or access terminal 304).

It will be appreciated that, in accordance with one or more aspects described herein, inferences can be made regarding use of power and phase coherence to multiplex and/or manage interference in the context of flash signals. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
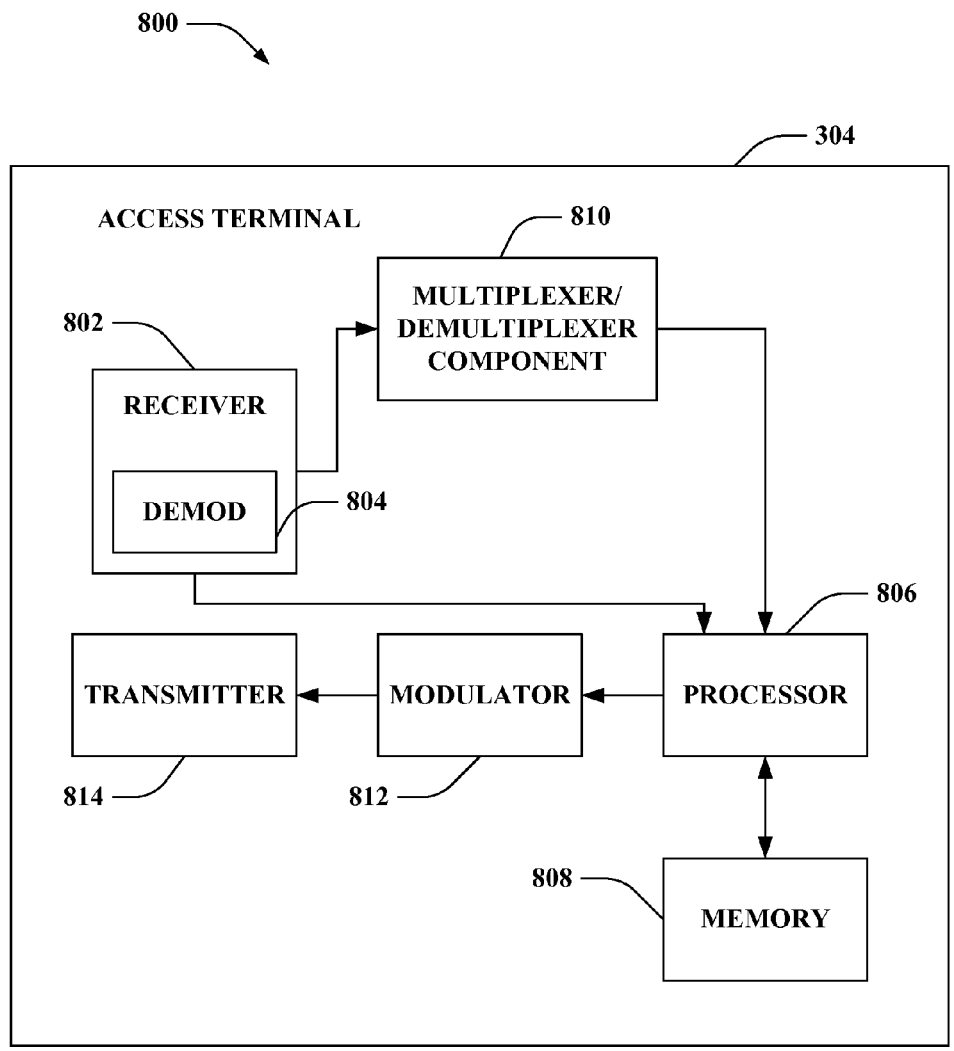
FIG. 8 is an illustration of an example access terminal that effectuates and/or facilitates use of power and phase coherence to multiplex and/or manage interference in the context of flash signals in a wireless communication system.

FIG. 8 is an illustration 800 of an access terminal 304 that facilitates transmitting circuit switched voice over packet switched networks. Access terminal 304 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 814, a processor that controls one or more components of access terminal 304, and/or a processor that both analyzes information received by receiver 802, generates information for transmission by transmitter 814, and controls one or more components of access terminal 304.

Access terminal 304 can additionally comprise memory 808 that is operatively coupled to processor 806 and that can store data to be transmitted, received data, and any other suitable information related to performing the various actions and functions set forth herein. For instance, memory 808 can store group-specific signaling constraints employed by one or more base stations. Memory 808 can additionally store protocols and/or algorithms associated with identifying signaling constraints used for communicating resource block assignments and/or employing such signaling constraints to analyze received assignment messages.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a multiplexer/demultiplexer component 810 which can be substantially similar to demultiplexer component 402 and multiplexer component 404 of FIG. 3. Multiplexer/demultiplexer component 810 can be employed to facilitate transmission of circuit switched voice over packet switched networks. Access terminal 304 still further comprises a modulator 812 and a transmitter 814 that transmits the signal to, for instance, a base station, another access terminal, etc. Although depicted as being separate from the processor 806, it is to be appreciated that multiplexer/demultiplexer component 810 and/or modulator 812 can be part of processor 806 or a number of processors (not shown).

Figure 9:
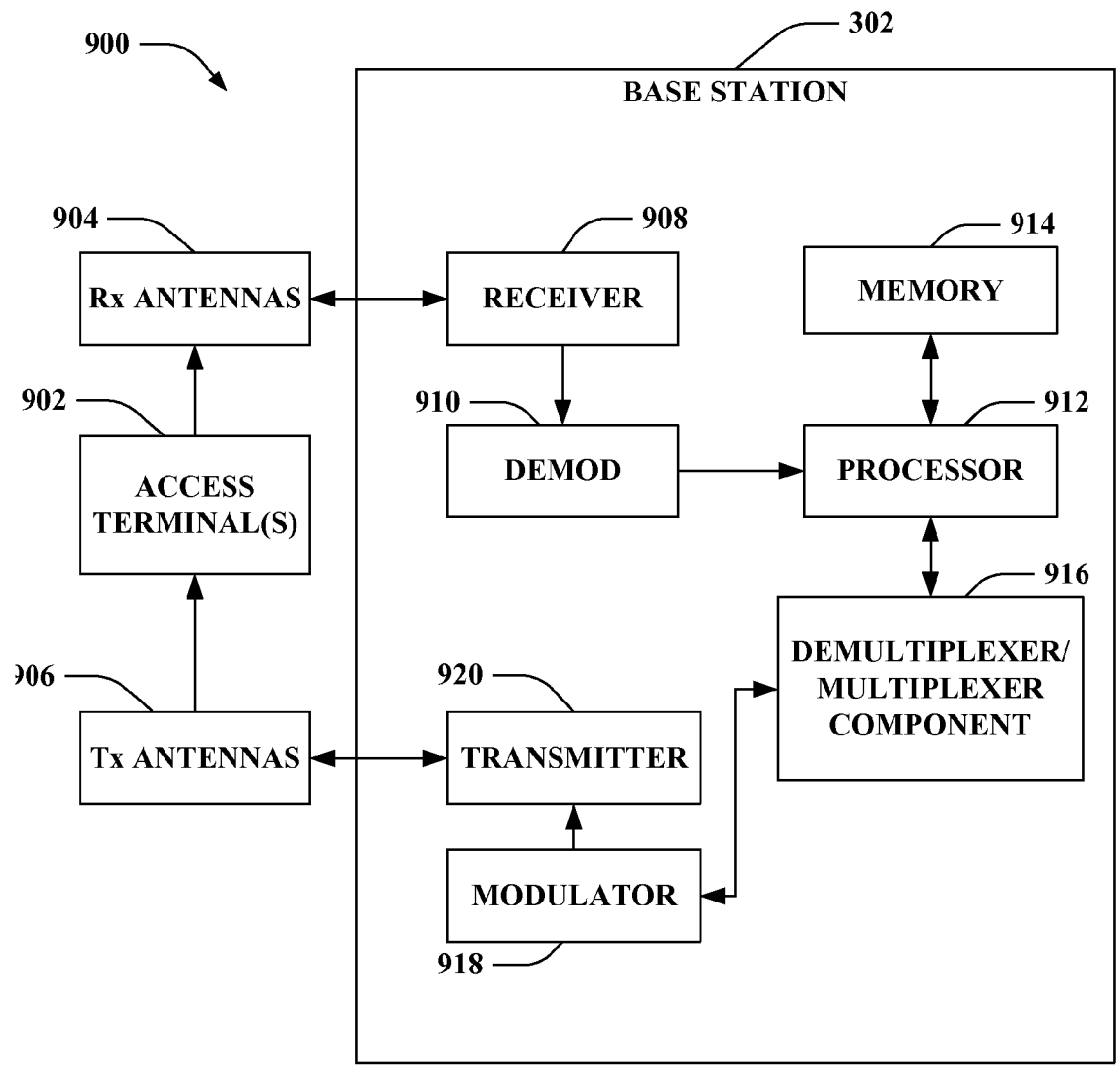
FIG. 9 is an illustration of an example system that facilitates effectuates and/or facilitates use of power and phase coherence to multiplex and/or manage interference in the context of flash signals in a wireless communication environment.

FIG. 9 is an illustration of a system 900 that facilitates transmitting circuit switched voice over packet switched networks. System 900 comprises a base station 302 (e.g., access point, . . . ) with a receiver 908 that receives signal(s) from one or more access terminals 304 through a plurality of receive antennas 904, and a transmitter 920 that transmits to the one or more access terminals 902 through a transmit antenna 906. Receiver 908 can receive information from receive antennas 904 and is operatively associated with a demodulator 910 that demodulates received information. Demodulated symbols are analyzed by a processor 912 that can be similar to the processor described above with regard to FIG. 8, and which is coupled to a memory 914 that stores data to be transmitted to or received from access terminal(s) 902 (or a disparate base station (not shown)) and/or any other suitable information related to performing the various actions and functions set forth herein. Processor 912 is further coupled to a demultiplexer/multiplexer component 916 that facilitate transmission of circuit switched voice over packet switched networks. Further, demultiplexer/multiplexer component 916 can provide information to be transmitted to a modulator 918. Modulator 918 can multiplex a frame for transmission by a transmitter 920 through antennas 906 to access terminal(s) 902. Although depicted as being separate from the processor 912, it is to be appreciated that demultiplexer/multiplexer component 916 and/or modulator 918 can be part of processor 912 or a number of processors (not shown).

Figure 10:
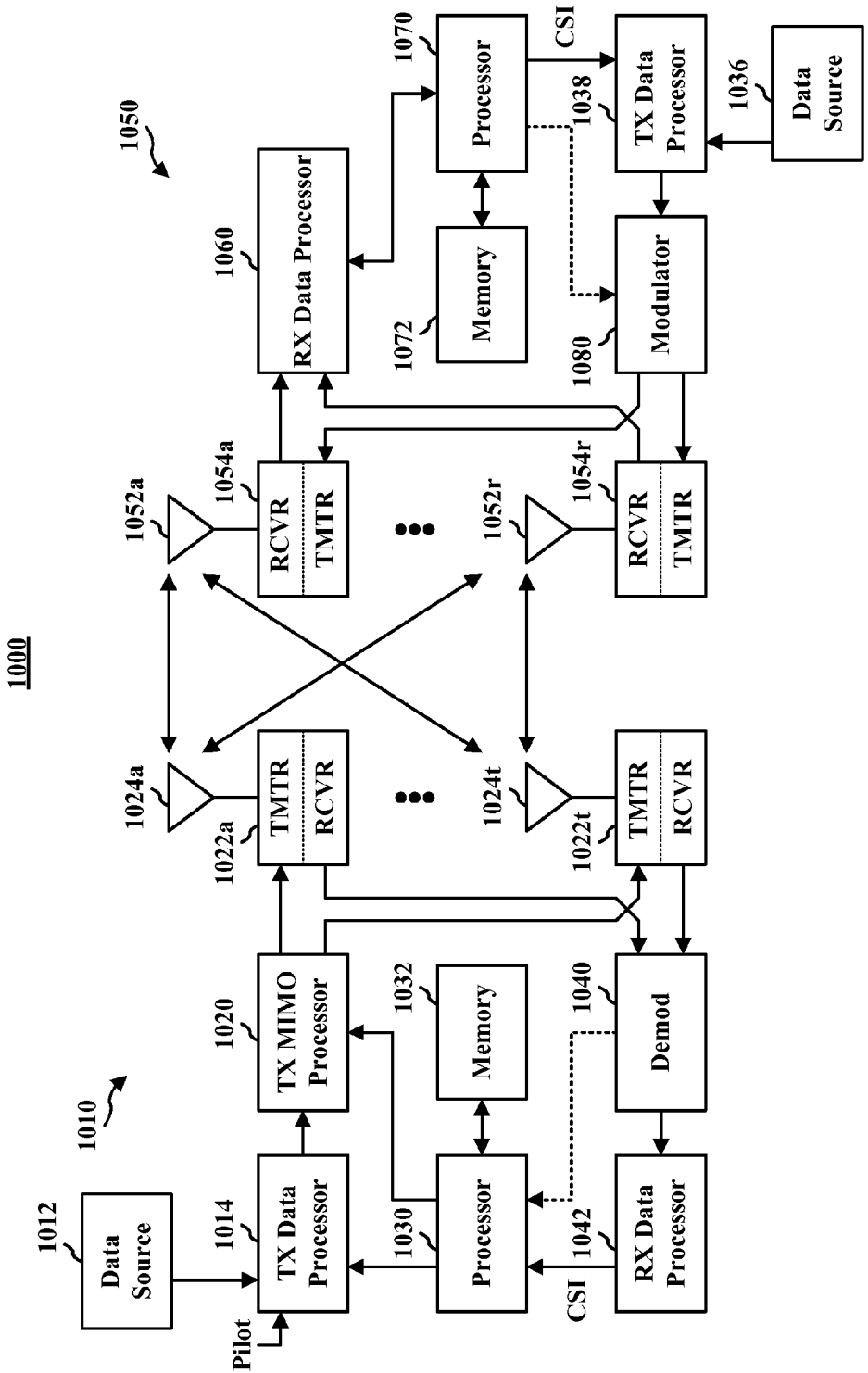
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems (FIGS. 1-4, 8-9, and 11-12) and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which preceding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
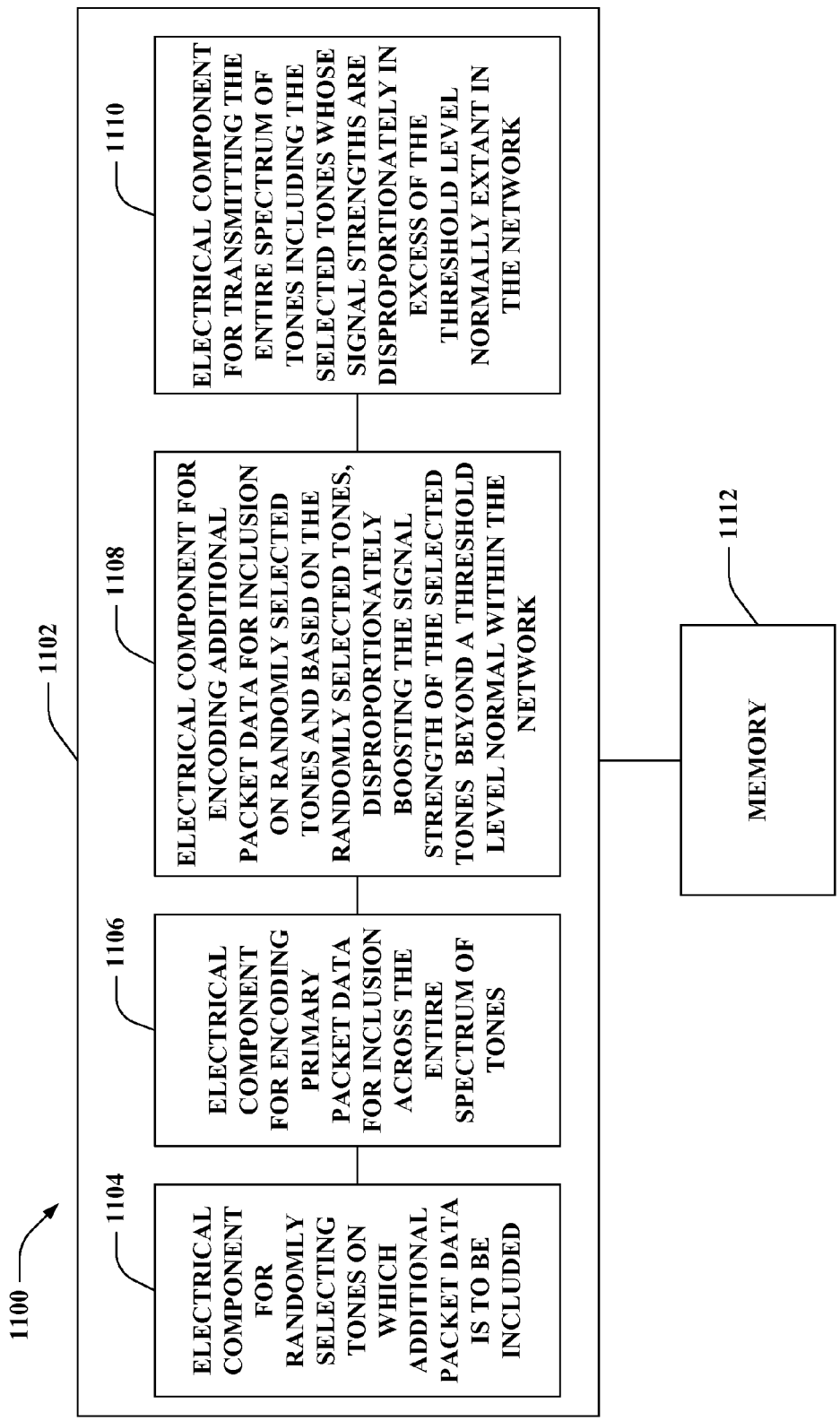
FIG. 11 is an illustration of an example system that enables use of power and phase coherence to multiplex and/or manage interference in the context of flash signals in a wireless communication environment.

With reference to FIG. 11, illustrated is a system 1100 that enables use of power and phase coherence to multiplex and/or manage interference in the context of flash signals in a wireless communication environment. For example, system 1100 can reside at least partially within a base station. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for randomly selecting tones on which additional packet data is to be included 1104. Further, logical grouping 1102 can include an electrical component for encoding primary packet data for inclusion across the entire spectrum of tones 1106. Moreover, logical grouping 1102 can comprise an electrical component for encoding additional packet data for inclusion on randomly selected tones and based on the randomly selected tones, disproportionately boosting the signal strength of the selected tones beyond a threshold level normal within the network 1108. Furthermore, logical grouping 1102 can comprise an electrical component for transmitting the entire spectrum of tones including the selected tones whose signal strengths are disproportionately in excess of the threshold level normally extant in the network 1110. Additionally, system 1100 can include a memory 1112 that retains instructions for executing functions associated with electrical components 1104, 1106, 1108, and 1110. While shown as being external to memory 1112, it is to be understood that one or more of electrical components 1104, 1106, 1108, and 1110 can exist within memory 1112.

Figure 12:
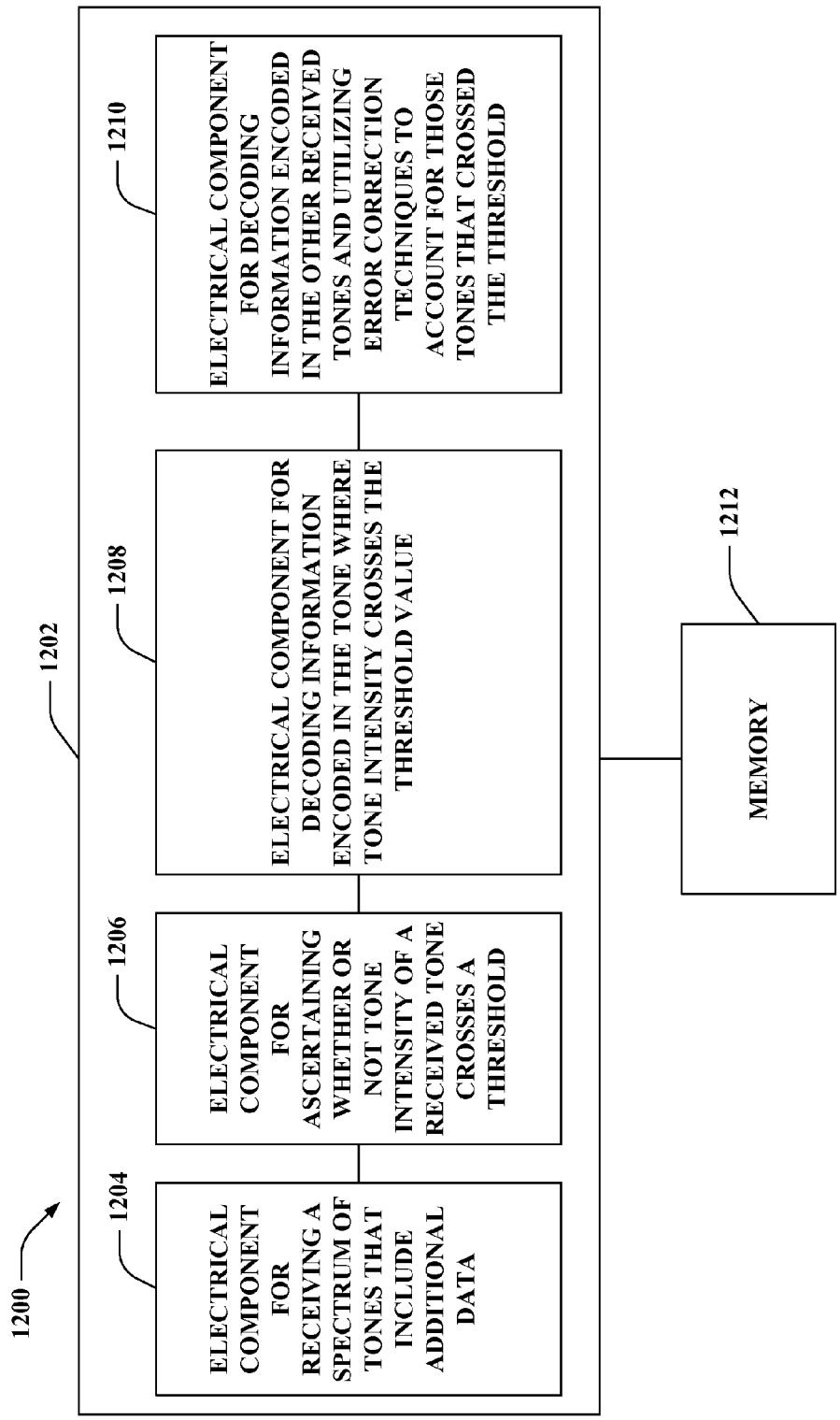
FIG. 12 is an illustration of an example system that enables use of power and phase coherence to multiplex and/or manage interference in the context of flash signals in a wireless communication environment.

Turning to FIG. 12, illustrated is a system 1200 that enables use of power and phase coherence to multiplex and/or manage interference in the context of flash signals in a wireless communication environment. System 1200 can reside within an access terminal, for instance. As depicted, system 1200 includes functional blocks that can represent functions implemented by a processor, software, or combination thereof (e.g., firmware). System 1200 includes a logical grouping 1202 of electrical components that can act in conjunction. Logical grouping 1202 can include an electrical component for receiving a spectrum of tones that include additional data 1204. Further, logical grouping 1202 can include an electrical component for ascertaining whether or not tone intensity of a received tone crosses a threshold 1206. Moreover, logical grouping 1202 can include an electrical component for decoding information encoded in the tone where tone intensity crosses the threshold value 1208. Moreover, logical grouping 1202 can include an electrical component for decoding information encoded in the other received tones and utilizing error correction techniques to account for those tones that crossed the threshold. Additionally, system 1200 can include a memory 1212 that retains instructions for executing functions associated with electrical components 1204, 1206, 1208, and 1210. While shown as being external to memory 1212, it is to be understood that electrical components 1204, 1206, 1208, and 1210 can exist within memory 1212.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that effectuates use of power and phase coherence to multiplex or manage interference in a wireless communication environment, comprising:
   receiving a spectrum of tones that include additional data;
   ascertaining whether a tone intensity of a received tone included in the spectrum of tones exceeds a threshold, wherein a tone intensity that exceeds the threshold indicates inclusion of additional information that overwrites a tone initially encoded to carry primary data;
   based at least in part on whether the tone intensity of the received tone exceeds the threshold, decoding information included in the received tone to extract the additional data; and
   decoding information included in one or more remaining tones that fail to exceed the threshold to extract primary data.

2. The method of claim 1, wherein the additional data includes information with short latency requirements.

3. The method of claim 2, wherein information with short latency requirements include Voice over Internet Protocol (VoIP) packets, Transmission Control Protocol (TCP) acknowledgement (ACK) packets, Transmission Control Protocol (TCP) negative acknowledgement (NACK) packets, or gaming packets.

4. The method of claim 1, wherein the primary data includes information with large latency requirements.

5. The method of claim 1, wherein decoding information included in the one or more remaining tones further comprising utilizing an error correction technique to correct for missing data caused by inclusion of tones with intensities greater than the threshold.

6. The method of claim 1, wherein the received tone that exceeds the threshold is randomly identified and included within the spectrum of tones.

7. The method of claim 1, wherein the threshold is set to a level that takes into account one or more ambient environmental factor extant within the wireless communication environment.

8. A wireless communications apparatus, comprising:
   a memory that retains instructions related to
      acquiring a spectrum of tones that include additional data, determining whether a tone intensity of a received tone included in the spectrum of tones exceeds a threshold wherein a tone intensity that exceeds the threshold indicates inclusion of additional information that overwrites a tone initially encoded to carry primary data, based at least in part on the determining, extracting the additional information included in the received tone, and extracting primary data included on one or more remaining tones that fail to exceed the threshold; and
   a processor, coupled to the memory, configured to execute the instructions retained in the memory.

9. The wireless communications apparatus of claim 8, wherein the additional data includes information with short latency requirements.

10. The wireless communications apparatus of claim 9, wherein information with short latency requirements include Voice over Internet Protocol (VoIP) packets, Transmission Control Protocol (TCP) acknowledgement (ACK) packets, Transmission Control Protocol (TCP) negative acknowledgement (NACK) packets, or gaming packets.

11. The wireless communications apparatus of claim 8, wherein the extracting the additional information included in the received tone further comprising employing error correction techniques to correct for missing data caused by inclusion of tones with intensities greater than the threshold.

12. The wireless communications apparatus of claim 8, wherein the received tone that exceeds the threshold is randomly intercalated within the spectrum of tones.

13. A wireless communications apparatus that effectuates use of power and phase coherence to multiplex or manage interference in a wireless communication environment, comprising:
    means for receiving a spectrum of tones that include additional data;
    means for ascertaining whether a tone intensity of a received tone included in the spectrum of tones exceeds a threshold, wherein a tone intensity that exceeds the threshold indicates inclusion of additional information that overwrites a tone encoded to convey primary data;
    means for decoding information included in the received tone to extract the additional data based at least in part on whether the tone intensity of the received tone exceeds the threshold; and
    means for extracting primary data on one or more remaining tones that fail to exceed the threshold.

14. The wireless communications apparatus of claim 13, wherein the additional data includes information with short latency requirements.

15. The wireless communications apparatus of claim 13, wherein the primary data includes information with large latency requirements.

16. The wireless communications apparatus of claim 13, wherein the means for extracting further comprising means for correcting for missing data caused by inclusion of tones with intensities greater than the threshold.

17. The wireless communications apparatus of claim 13, wherein the received tone that exceeds the threshold is randomly identified and included within the spectrum of tones.

18. A computer program product, comprising:
    a non-transitory computer-readable medium comprising:
        code for obtaining a spectrum of tones that include additional data;
        code for ascertaining whether a tone intensity of a received tone associated with the additional data exceeds a threshold, wherein a tone intensity that exceeds the threshold indicates inclusion of additional information that overwrites a tone encoded to convey primary data;
        code for extracting the additional data from the received tone with the tone intensity that exceeds the threshold; and
        code for extracting primary data for the received tone that fails to exceed the threshold.

19. The computer program product of claim 18, wherein the non-transitory computer-readable medium further comprises code for utilizing error correction techniques to correct for missing data caused by inclusion of tones associated with intensities that surpass the threshold.

20. The computer program product of claim 18, wherein the primary data includes information with large latency requirements.

21. The computer program product of claim 18, wherein the additional data includes information with short latency requirements.

22. The computer program product of claim 21, wherein the received tone that exceeds the threshold is randomly identified and included within the spectrum of tones.

23. A wireless communications apparatus, comprising:
    a processor configured to:
        receive a spectrum of tones that include additional data;
        determine whether a tone intensity of a received tone included in the spectrum of tones markedly surpasses a threshold, wherein a tone intensity that exceeds the threshold indicates inclusion of additional information that overwrites a tone encoded to convey primary data;
        extract additional data included in the received tone based at least in part on whether the tone intensity of the received tone exceeds the threshold; and
        extract primary data included in the received tone that fails to exceed the threshold.

24. The wireless communications apparatus of claim 23, wherein the processor is further configured to employ error correction codes to correct for omissions in the primary data caused by one or more received tones that surpass the threshold being super positioned over a tone that initially conveyed primary data.

25. A method that effectuates use of power and phase coherence to multiplex or manage interference in a wireless communication environment, comprising:
    randomly selecting one or more tones on which to convey additional data;
    encoding primary data across a spectrum of tones;
    encoding the additional data on the one or more randomly selected tones and artificially boosting the one or more randomly selected tones to exceed a threshold, wherein the encoding the additional data on the one or more randomly selected tones causes the primary data included in an underlying tone to be overwritten; and
    transmitting the spectrum of tones that includes the one or more randomly selected and artificially boosted tones.

26. The method of claim 25, wherein the additional data includes Voice over Internet Protocol (VoIP) packets, Transmission Control Protocol (TCP) acknowledgement (ACK) packets, Transmission Control Protocol (TCP) negative acknowledgement (NACK) packets, or gaming packets.

27. The method of claim 25, wherein the artificial boosting of the one or more randomly selected tones takes into account environmental conditions extant in a segment of the wireless communication environment.

28. The method of claim 27, wherein the threshold is set to a point beyond which naturally occurring environmentally induced boosting fails to occur.

29. A wireless communications apparatus, comprising:
    a memory that retains instructions related to randomly selecting one or more tones on which to convey additional data, encoding primary data across a spectrum of tones, encoding the additional data on the one or more randomly selected tones and artificially boosting the one or more randomly selected tones to exceed a threshold, and transmitting the spectrum of tones that includes the one or more randomly selected and artificially boosted tones, wherein the encoding of the additional data on the one or more randomly selected tones causes the primary data included in an underlying tone to be overwritten; and
    a processor, coupled to the memory, configured to execute the instructions retained in the memory.

30. The wireless communications apparatus of claim 29, wherein the artificial boosting of the one or more randomly selected tones takes into account environmental conditions extant in a portion of a wireless communication environment.

31. A wireless communications apparatus that effectuates use of power and phase coherence to multiplex or manage interference in a wireless communication environment, comprising:
 means for randomly selecting one or more tones on which to convey additional data;
 means for distributing primary data across a spectrum of tones;
 means for distributing the additional data on the one or more randomly selected tones and artificially boosting the one or more randomly selected tones to exceed a threshold, wherein the means for distributing the additional data on the one or more randomly selected tones causes the primary data included in an underlying tone to be overwritten; and
 means for transmitting the spectrum of tones that includes the one or more randomly selected and artificially boosted tones.

32. The wireless communications apparatus of claim 31, wherein the artificial boosting of the one or more randomly selected tones takes into account environmental conditions extant in the wireless communication environment.

33. A computer program product, comprising:
 a non-transitory computer-readable medium, comprising:
  code for randomly selecting one or more tones on which to convey additional data;
  code for encoding primary data across a spectrum of tones;
  code for encoding the additional data on the one or more randomly selected tones and artificially boosting the one or more randomly selected tones to exceed a threshold;
  code for overwriting tones associated with the primary data with the one or more randomly selected and artificially boosted tones associated with the additional data; and
  code for transmitting the spectrum of tones that includes the one or more randomly selected and artificially boosted tones.

34. A wireless communications apparatus, comprising:
 a processor configured to:
  randomly select one or more tones on which to convey additional data;
  disperse primary data across a spectrum of tones;
  include the additional data on the one or more randomly selected tones and artificially boost the one or more randomly selected tones to exceed a threshold;
  overwrite tones encoding primary data with the one or more randomly selected tones exceeding the threshold; and
  broadcast the spectrum of tones that includes the one or more randomly selected and artificially boosted tones.

35. The wireless communications apparatus of claim 34, wherein the artificially boosting of the one or more randomly selected tones takes into account environmental conditions extant in a wireless communication environment.

* * * * *